United States Patent
Kuwayama

(10) Patent No.: US 6,708,788 B2
(45) Date of Patent: Mar. 23, 2004

(54) VEHICLE POWERED BY A BATTERY

(75) Inventor: Junichi Kuwayama, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/855,554

(22) Filed: May 15, 2001

(65) Prior Publication Data

US 2001/0045307 A1 Nov. 29, 2001

(30) Foreign Application Priority Data

May 16, 2000 (JP) ........................................ 2000-143889

(51) Int. Cl.[7] ................................................. B60K 6/00
(52) U.S. Cl. .................... 180/65.2; 180/65.7; 180/65.8; 477/3
(58) Field of Search ................. 180/65.1, 65.2, 180/65.6, 65.7, 65.8; 477/3; 440/6; 363/56.07, 132; 318/34, 41, 49, 139; 475/2; 701/20, 101, 110

(56) References Cited

U.S. PATENT DOCUMENTS

| | | | |
|---|---|---|---|
| 3,950,691 A | * 4/1976 | Ohba | .................... 363/56.07 |
| 4,659,970 A | 4/1987 | Melocik | |
| 5,199,912 A | * 4/1993 | Dade et al. | .................... 440/6 |
| 5,230,402 A | 7/1993 | Clark et al. | |
| 5,289,890 A | * 3/1994 | Toyoda et al. | ............. 180/65.8 |
| 5,365,153 A | * 11/1994 | Fujita et al. | .................. 318/34 |
| 5,466,998 A | * 11/1995 | Kinoshita et al. | ............. 318/139 |
| 5,487,438 A | * 1/1996 | Kinoshita | .................. 180/65.1 |
| 5,512,022 A | * 4/1996 | Suzuki | .......................... 475/2 |
| 5,517,401 A | * 5/1996 | Kinoshita et al. | ............. 363/132 |
| 5,562,178 A | * 10/1996 | Worden et al. | ............. 180/65.1 |
| 5,611,233 A | 3/1997 | Basstein | |
| 5,633,577 A | * 5/1997 | Matsumae et al. | ............. 322/37 |
| 5,915,488 A | * 6/1999 | Fliege | ........................ 180/65.2 |
| 5,991,683 A | * 11/1999 | Takaoka et al. | ............. 701/102 |
| 6,057,669 A | * 5/2000 | Lai et al. | ..................... 320/116 |
| 6,364,806 B1 | * 4/2002 | Spaniel | ..................... 180/65.7 |

* cited by examiner

*Primary Examiner*—Brian L. Johnson
*Assistant Examiner*—Hau Phan
(74) *Attorney, Agent, or Firm*—Morgan & Finnegan, LLP

(57) ABSTRACT

A driving force transmission unit consists of a gear unit engaging with the motor axes of two AC motors, and a bevel gear for transmitting the driving forces of the two AC motors to an axle. Wheels are installed on both ends of the axle. The output voltage of a battery of low voltage is transformed to AC voltage by a DC/AC transformer, and the transformed voltage is supplied to the two AC motors. Then, the driving forces of the two AC motors are synthesized to be transmitted to the axle.

6 Claims, 3 Drawing Sheets

VEHICLE POWERED BY A BATTERY

BACKGROUND OF THE INVENTION

1. Field of the Invention

The present invention relates to a vehicle that is driven by batteries, such as an electric automobile, a forklift, etc.

2. Description of the Related Art

In a vehicle which is driven by a motor using a battery as the power supply, for example, a forklift, increased powering is desired so as to be able to carry a heavy load at higher speed.

The method of increasing the power a forklift is to increase the output of a drive motor. However, in order to increase the output of the drive motor, the diameter of the motor or the length of the motor in the axial direction should be increased. Consequently, there is the problem that the external form of the apparatus that accommodates the motor becomes large. Further, when a motor with high power is newly developed, there arises another problem that the cost of the motor becomes high.

In order to solve such problems, for example, in a model (Japanese Utility Model Laid-Open Publication No. Hei 7-11807) regarding Japanese Utility Model Application No. Hei 5-42904, two direct current motors are connected in series with a battery, an output synthesizing mechanism is connected with the output axes of the two direct current motors, and furthermore the output synthesizing mechanism is engaged with an axle. Thus, an output twice that of a single motor can be obtained.

However, the method of connecting motors in series with a battery is applicable only to a direct current motor, but is not applicable to an AC motor. Further, in order to connect two motors in series, the output voltage of a battery should be high.

For example, in the case of a forklift that is used to carry a load of which the weight is equal to or less than three tons, the output voltage of the battery is generally low, approximately 36V or 48V, and a direct current motor of which the drive voltage is 36V or 48V is used in accordance with the output voltage of the battery.

In the case of realizing a forklift with a heavy load and of which two direct current motors are connected in series, thereby carrying a load of which the weight is equal to or more than four tons, the output voltage of the battery is required to be twice that of the drive voltage of the direct current motor. Therefore, the output voltage should be 72V or 96V. In the case that such a battery and a power circuit of high output voltage are widely used in another apparatus of the forklift, the battery and power circuit can be directly used. However, the battery of the forklift that is used for a load of which the weight is equal to or less than three tons generally has low voltage equal to or less than 50V.

Accordingly, the method of connecting direct current motors in series and obtaining high power requires the usage of a battery of high voltage and the design of a power circuit that is used exclusively for high voltage. Therefore, there is the problem that it takes a long time to develop such a circuit and accordingly the part cost becomes high.

In the case of an AC motor, it is conceivable that a battery of high voltage of which the output voltage is 72V or 96V and two AC motors of 36V or 48V are used. However, in order to use them, the output voltage of the battery is required to be reduced by a transformer, and accordingly the part cost becomes high.

Further, in the case that the battery of high voltage is used, many of the parts other than the motors, such as auxiliary machinery, lamps, etc., of a forklift, have the maximum rating voltage equal to or less than 48V. Therefore, in the case that the battery of high voltage is used, the parts other than motors should be connected with the terminals of 48V of the battery, and there arises the problem that the battery wears asymmetrically.

Furthermore, in the case that the existing battery of low voltage in the forklift is replaced, the output voltage of a new battery should be matched with the existing machine type so that the modification, etc., of the existing charging equipment is not required. Therefore, it is difficult to use the battery of high output voltage of which the machine type is different from that of the existing battery.

SUMMARY OF THE INVENTION

The object of the present invention is to obtain high power using a battery and an AC motor of low voltage.

The present invention comprises of a battery, a DC/AC transformer for transforming the output voltage of the battery into AC voltage, a plurality of AC motors connected in parallel to the battery to which voltage is supplied from the DC/AC transformer, and a driving force transmission unit engaging the output axes of the plurality of AC motors and transmitting the driving forces that are obtained from the plurality of AC motors to a wheel.

According to the present invention, a vehicle of high power can be realized at low cost by driving a plurality of AC motors in parallel and synthesizing the driving forces of these AC motors, thereby transmitting the synthesized force to a wheel.

Further, the present invention may be configured by a detecting unit for detecting the output property of at least one AC motor of a plurality of AC motors, and a control unit for controlling the rotation number of the AC motor having the detecting unit and the rotation numbers of other AC motors based on the output property value that is detected by the detecting unit.

Since this configuration enables the rotation numbers of a plurality of AC motors to be controlled based on the rotation number of at least one AC motor, the control of rotation numbers of a plurality of AC motors can be simplified.

For example, the control unit generates a control signal for controlling the output current of the DC/AC transformer based on the rotation number of one AC motor and the desired speed that is indicated by a driver. Thus, the DC/AC transformer that is connected to the AC motor having a detecting unit and the DC/AC transformers that are connected to other AC motors are controlled by the same control signal, and the rotation numbers of a plurality of AC motors can be controlled.

In this way, since control of the rotation numbers of a plurality of AC motors can be controlled by the same control signal, control of the rotation numbers of the AC motors can be simplified.

The driving force transmission unit consists of, for example, the first engaging unit that engages the output axes of the first and second AC motors, and the second engaging unit that transmits the driving force of the first engaging unit to the axle.

DESCRIPTION OF THE PREFERRED EMBODIMENTS

Figure 1:
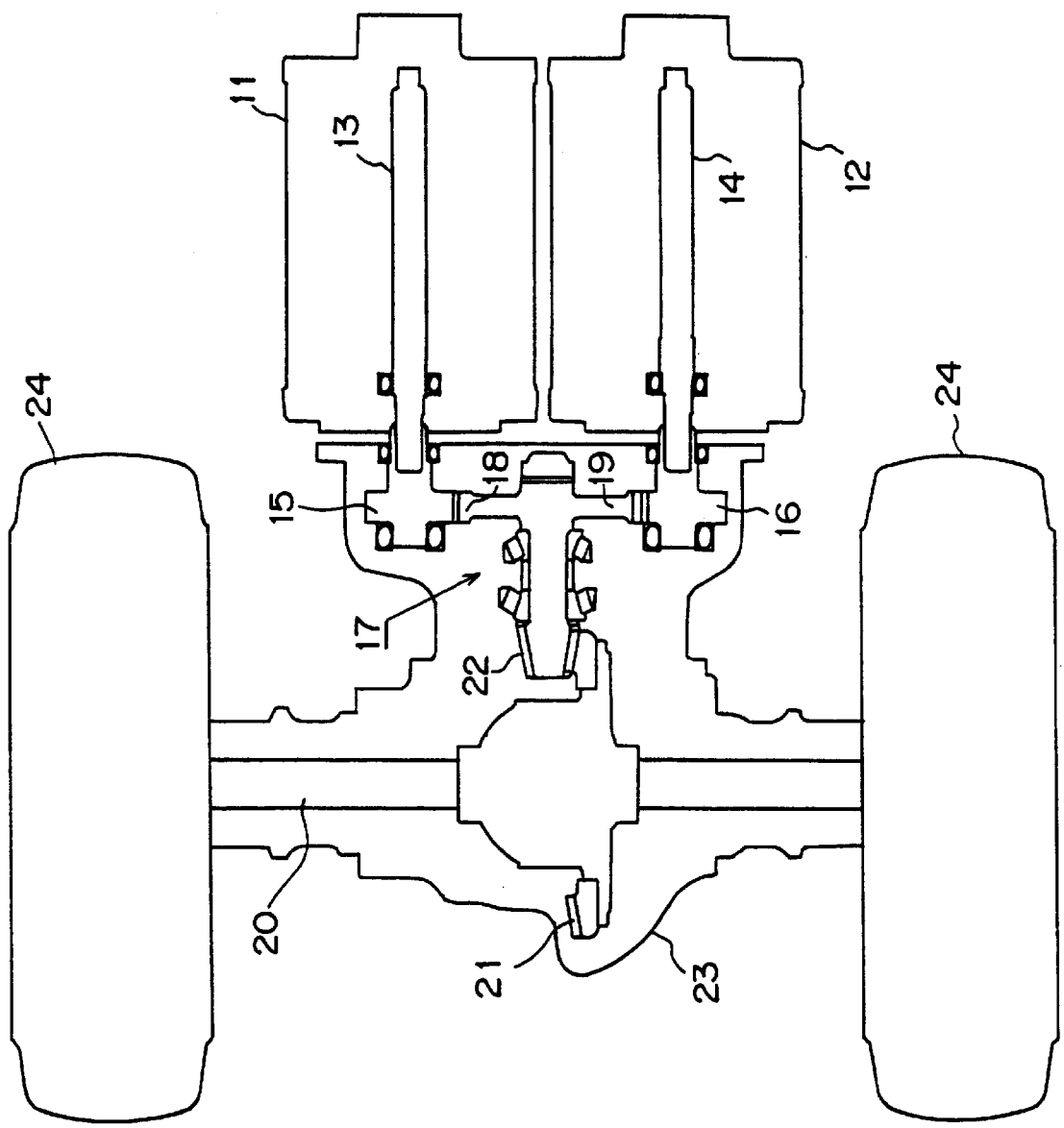
FIG. 1 is a drawing showing a driving force transmission member and a motor.

The following is an explanation of the preferred embodiments of the present invention, with reference to the drawings. FIG. 1 is a drawing showing AC motors 11 and 12 of a forklift of the preferred embodiment of the present invention, and a driving force transmission member 17 that transmits the rotation of the AC motors 11 and 12 to the axle.

Two gears 15 and 16 are provided with motor axes 13 and 14 of two three-phase AC motors 11 and 12.

The driving force transmission unit 17 has gear units 18 and 19 that are engaged with gears 15 and 16 fixed with the motor axes 13 and 14, and a bevel gear 22 that is engaged with a bevel gear 21 installed at the central part of an axle 20. The gear units 18 and 19 may be part of the gear of the engaging unit that consists of one gear, or may be configured in such a way that the gear units individually consist of different gears and synthesize the rotations of the respective gears, thereby transmitting the synthesized rotation to the bevel gear 22.

At the driving force transmission member 17, the gear units 18 and 19, and the bevel gear 22 are connected by an axis, and the axis is supported by a bearing. The surrounding part of the bearing is installed in the frame of the forklift. The driving force transmission unit 17 synthesizes the driving forces of the two AC motors 11 and 12, and transmits the synthesized force to the axle 20.

The bevel gear 21 is fixed at the center of the axle 20, and wheels 24 to which tires are attached are fixed at both ends of the axle 20.

The rotations of the AC motors 11 and 12 are transmitted to the gear units 18 and 19, respectively, of the driving force transmission member 17 by the gears 15 and 16, respectively. The bevel gear 22 rotates due to the rotation of the gear units 18 and 19. Thus, the rotation of the bevel gear 22 is transmitted to the bevel gear 21 that is installed in the axle 20, thereby rotating the wheel 24.

The bevel gear 21 that is installed in the driving force transmission unit 17 and axle 20 is covered with a case 23.

Figure 2:
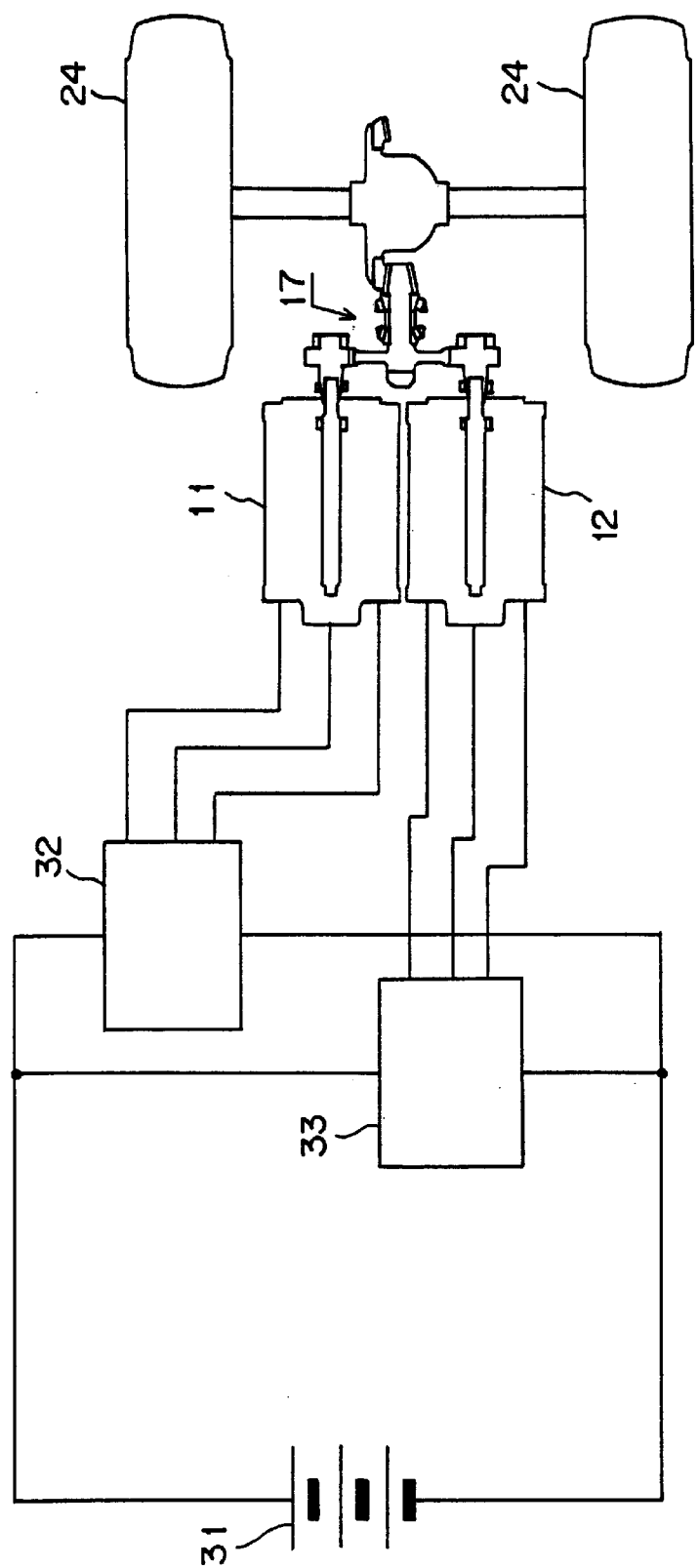
FIG. 2 is a drawing showing the configuration of a power circuit.

Next, the power circuit that supplies drive voltage to the AC motors 11 and 12 is explained with reference to FIG. 2.

A battery 31 is a low-voltage battery of which the output voltage is 48V, and DC/AC transformers 32 and 33 are connected in parallel with the output terminal of the battery. The DC/AC transformers 32 and 33 are configured by, for example, a plurality of MOSFETs (Metal Oxide Semiconductor Field Effect Transistors), and transform the direct voltage to three-phase AC voltage by turning on and off the MOSFETs. The power supply terminal of the AC motor 11 is connected with the output terminal of the DC/AC transformer 32. The power supply terminal of the AC motor 12 is connected with the output terminal of the DC/AC transformer 33. In other words, the AC motors 11 and 12 are connected in parallel with the battery 31. The AC motors 11 and 12 can be used with low voltage in accordance with the output voltage of the battery 31.

Figure 3:
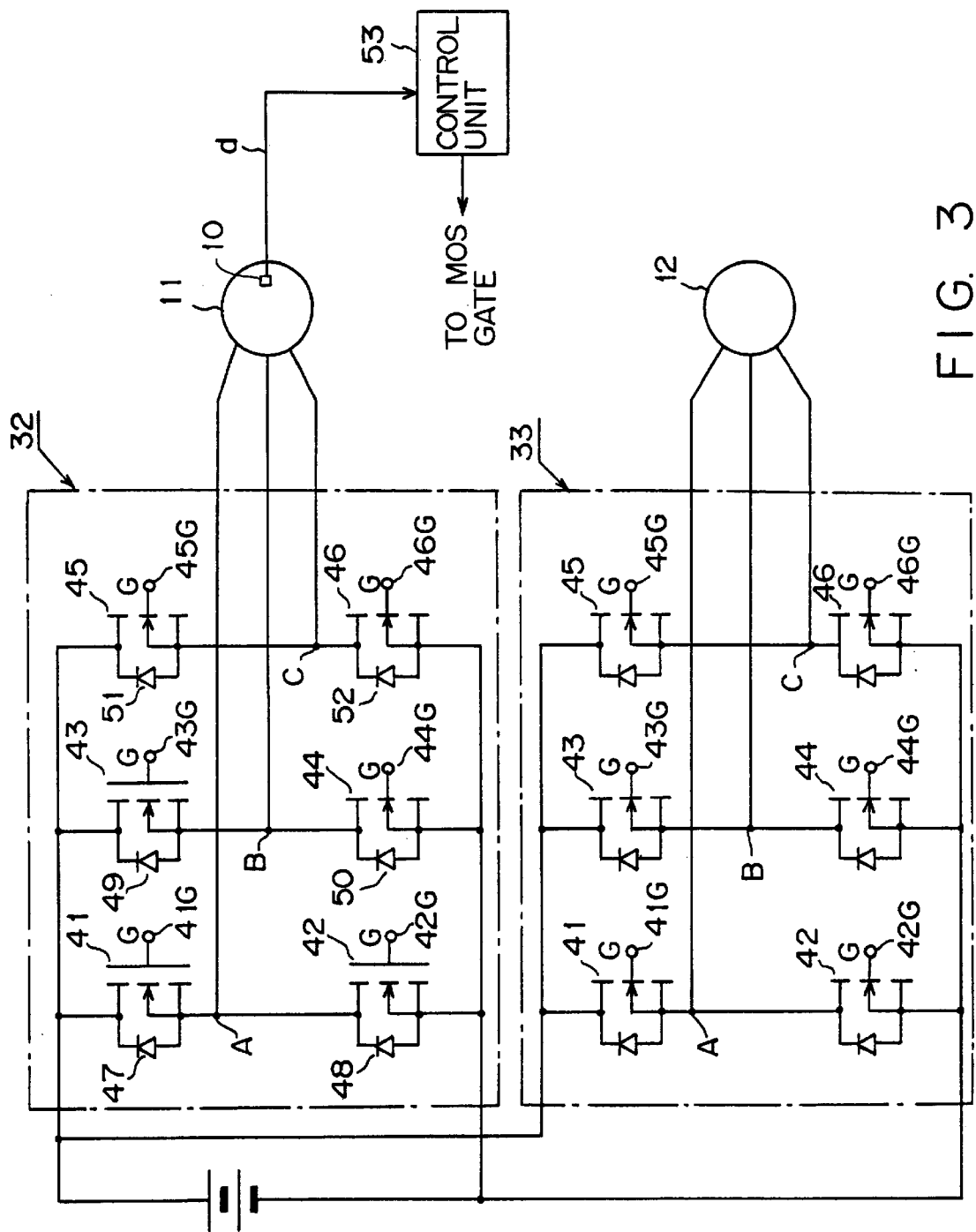
FIG. 3 is a drawing showing the configurations of a DC/AC transformer and a control unit.

Next, FIG. 3 is a drawing showing one example of the DC/AC transformers 32 and 33. Each of the DC/AC transformers 32 and 33 consists of six MOSFETs 41 to 46, and diodes 47 to 52 connected in parallel with the MOSFETs 41 to 46. The MOSFET 41 and MOSFET 42 are connected in series, and the connection point A is connected with one of the power supply terminals of the AC motor 11. Further, a MOSFET 43 and a MOSFET 44 are connected in series, and the connection point B is connected with the second power supply terminal of the AC motor 11. Further, a MOSFET 45 and a MOSFET 46 are connected in series. The connection point C is connected with the third power supply terminal of the AC motor 11.

Gate terminals 41G to 46G of the MOSFETs 41 to 46 are connected with a control unit 53, and the MOSFETs 41 to 46 are turned on or off by the control unit 53.

A sensor 10 for detecting the output property of a motor, for example, the rotation number of a rotator of the motor, is installed in the AC motor 11, and a detection signal of the sensor 10 is output to the control unit 53. As for the sensor 10 which is provided with the AC motor 11 and is used for the detection of the rotation number, a publicly-known sensor such as an encoder of an optical type, a rotation calculator using a magnetic sensor, etc., can be used.

The control unit 53 calculates the speed of a forklift using a detection signal d that is detected by the sensor 10 to be used for the detection of a rotation number of the motor 11. At the same time, the control unit 53 detects the desired speed that is indicated by a driver using the pushing strength of the accelerator, and controls the output current of the DC/AC transformers 32 and 33 so as to match the indicated speed. In the present embodiments, two AC motors 11 and 12 are used, and the sensor 10 for detecting the rotation number is installed in only one AC motor 11, and the output currents of the two DC/AC transformer 32 and 33 are controlled based on the rotation number detected by the sensor 10.

When the output properties of the two AC motors 11 and 12 are different and the same current is supplied to these AC motors 11 and 12, the rotation number of the AC motor 11 is different from that of the AC motor 12. However, since the two AC motors 11 and 12 are connected by the driving force transmission member 17, the load of the AC motor of small output becomes the load of the AC motor of large output, even in the case that the rotation numbers of the two AC motors differ. Therefore, the rotation numbers of the two AC motors are made to match.

Accordingly, by detecting the rotation number of one AC motor and controlling the output currents of the two DC/AC transformers 11 and 12 based on the detected rotation number, the rotation numbers of the two AC motors 11 and 12 can be properly controlled.

According to the above-mentioned present embodiments, since the forklift for a heavy load can be realized using the battery of low voltage that is used for the forklift for a light load and the AC motor for the low voltage, the part cost can be reduced. Further, since the existing AC motor can be used and a new AC motor need not be designed, the development period of the product can accordingly be reduced.

Further, since the sensor for detecting the rotation number is installed in only one of the two AC motors and the control signal for controlling the outputs of the two DC/AC transformers 32 and 33 based on the rotation number that is detected by the one sensor is generated, control can be simplified in the case that a plurality of DC/AC transformers are provided. Further, since it is sufficient to install a sensor for detecting the rotation number in only one AC motor, the part cost can also be reduced.

The driving force transmission member 17 is not limited to such a structure consisting of the spur gear units 18 and 19 and the bevel gear 22 that are described in the preferred embodiments, and another publicly-known driving force transmission mechanism can be used. In the driving force transmission member 17, for example, a plurality of gears may be used or the rotation power may be transmitted by a synchronous belt, etc.

In the above-mentioned embodiments, the rotation numbers of the two AC motors are controlled based on the rotation number of one of the two AC motors. Otherwise, sensors may be respectively provided with AC motors to control each of them, or the motors may be controlled based on the detection result of a plurality of sensors. Further, angular velocity, etc., other than the rotation number may be detected.

The above-mentioned embodiments describe the case that the present invention is applied to a forklift, but the present invention can be applied not only to a forklift, but also can be applied to any apparatus or vehicle as long as it drives a motor using a battery as a power supply.

According to the present invention, a vehicle of high power can be provided at low cost using a battery and a plurality of AC motors of low voltage.

What is claimed is:

1. A vehicle powered by a battery comprising:

the battery;

at least one DC/AC transformer transforming an output voltage of the battery into an AC voltage;

a plurality of low voltage type AC motors connected in parallel with the battery via the at least one DC/AC transformer;

a driving force transmission unit engaging with output axes of the plurality of low voltage type AC motors and synthesizing driving force obtained from the plurality of low voltage type AC motors, thereby transmitting the synthesized driving force to a wheel;

a sensor for detecting the rotation number of one of the AC motors, provided to one of the AC motors;

a control unit for controlling rotation numbers of the AC motor provided with the sensor and one or more of the other AC motors based on the rotation number detected by the sensor.

2. The vehicle powered by the battery according to claim 1, wherein the plurality of DC/AC transformers are provided in accordance with the plurality of AC motors;

the sensor detects the rotation number of the AC motor; and the control unit controls an output of the DC/AC transformer based on a rotation number of one AC motor detected by the sensor and controls rotation numbers of the AC motor provided by the sensor and other AC motors.

3. The vehicle powered by the battery according to claim 1, wherein the driving force transmission unit engages with an output axis of a first AC motor and an output axis of a second AC motor, engages with an axle on which a wheel is installed, and synchronizes driving forces of the first and the second AC motors, thereby transmitting the synthesized forces to the wheel.

4. The vehicle powered by the battery according to claim 1, wherein the driving force transmission unit comprises:

a first engaging unit engaging with an output axis of a first AC motor and an output axis of a second AC motor, and a second engaging unit being connected with the first engaging unit, and synthesizing driving forces of the first and the second AC motors, thereby transmitting the synthesized forces to an axle.

5. The vehicle powered by the battery according to claim 1, wherein the driving force transmission unit comprises:

a first gear unit engaging with an output axis of a first AC motor;

a second gear unit engaging with an output axis of a second AC motor; and a third gear unit transmitting rotations of the first and the second gear units to an axle.

6. The vehicle powered by the battery according to claim 1, wherein the battery is a battery of a low voltage, and the AC motor is an AC motor of a low voltage.

* * * * *